H. L. HOPKINS.
HARVESTER.
No. 33,943. Patented Dec. 17, 1861.
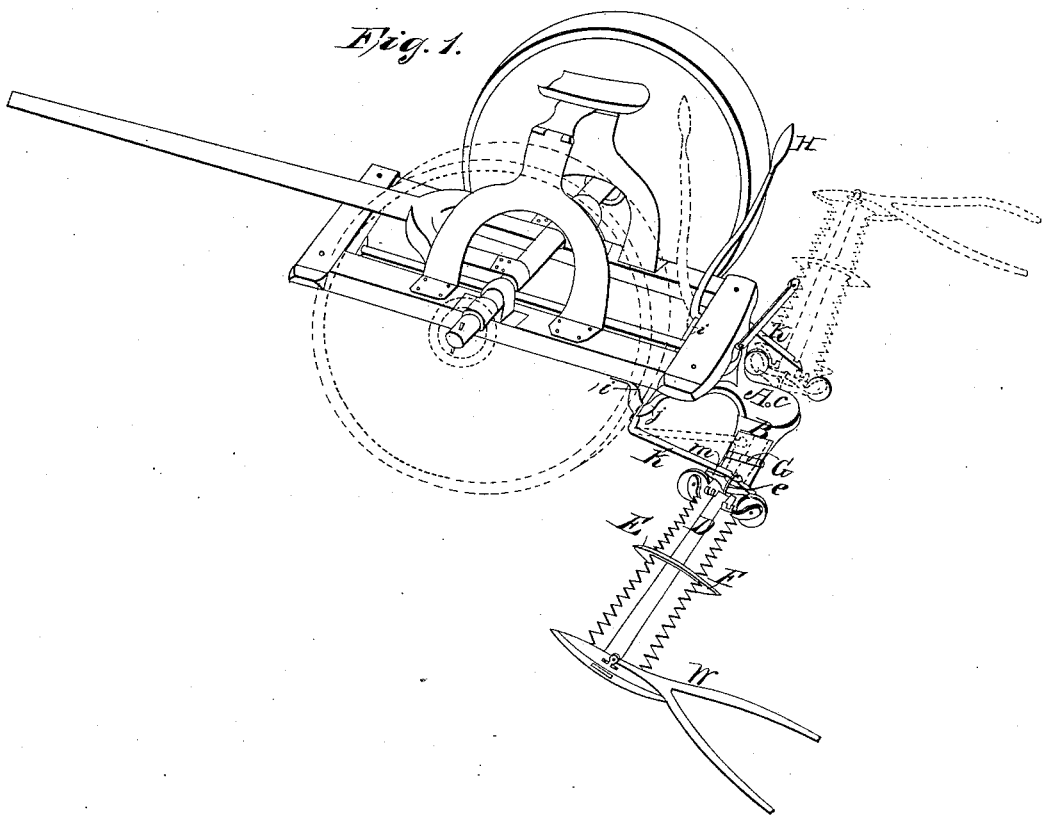
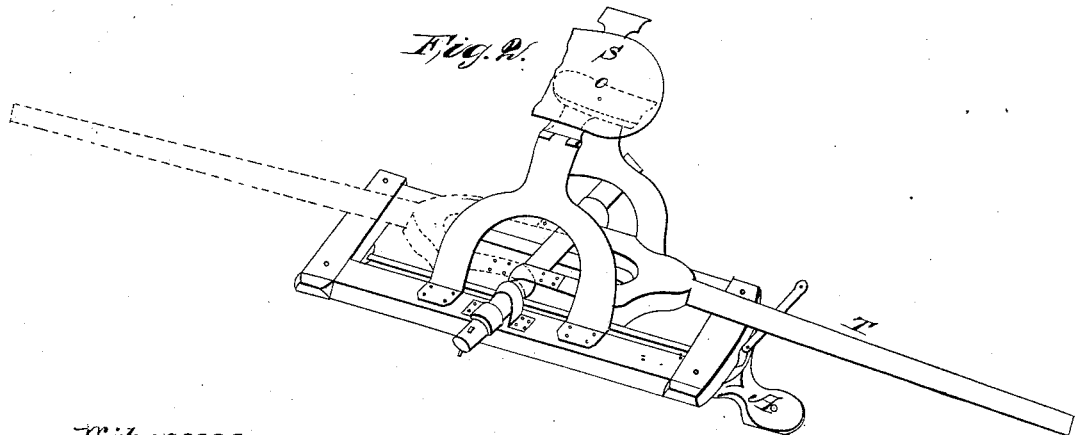

UNITED STATES PATENT OFFICE.

HARVEY L. HOPKINS, OF LEBANON, NEW YORK.

IMPROVEMENT IN HARVESTERS.

Specification forming part of Letters Patent No. 33,943, dated December 17, 1861.

*To all whom it may concern:*

Be it known that I, HARVEY L. HOPKINS, of Lebanon, in the county of Madison and State of New York, have invented new and useful Improvements in Grass and Grain Cutting Machines; and I do hereby declare that the following is a full, clear, and exact description thereof, reference being had to the accompanying drawings, and to the letters of reference marked thereon, in which—

Figure 1 is a perspective view with one of the wheels removed. Fig. 2 represents the frame, tongue, and driver's seat, &c.

My improvements consist in a new and useful mode of connecting the rack or finger bar to the main frame of the machine, so as to admit of its being turned around horizontally from one side of the frame to the other or opposite side, &c., and also in a new and useful mode of supporting the rack or finger bar on either side of the frame by means of a device which may at pleasure be employed to elevate and control the position of said rack or finger bar from the driver's seat; and my improvement further consists in so connecting the driver's seat to the frame of the machine that said seat may be turned upward upon a joint in such a manner as to allow the tongue to be turned over upon its pivoted connection for the purpose of drawing the machine in either direction, and in combination with said seat and tongue a finger-bar provided with two sets of cutters, one of which projects forward and the other rearward, all of which will be presently described.

The frame and supporting-wheels, also the mode of communicating motion to the cutters, are in all respects like those now in common use, and therefore will not require description.

Under the main frame, and at or near one end thereof, I bolt a strong casting. (Marked A in the drawings.) To the under side of said casting I connect an arm or coupling-piece (marked B) by means of a strong bolt, (shown at C.) At this point the coupling-piece is allowed to turn freely on its pivoted connection.

D represents the rack or finger bar, which is provided with two cutters and guard-fingers, projecting forward and backward, (marked E and F;) also a track-scraper, W, so connected to the outer shoe that it may be turned to either side.

G represents a joint in the coupling-piece, by means of which the rack or finger bar may be turned up into a position that will allow it to rest upon the frame in rear or at the side thereof.

H represents a hand-lever within convenient reach of the driver's seat. Said lever is connected to a strong bar of iron. (Marked $i\ i$.) Said bar extends across the frame of the machine, and is supported by hangers, one of which is not shown in the drawings. It is arranged, however, like the one shown at $j$, and located in under the opposite cross-piece of the frame. Said bar is provided with angular ends K K.

Connected with the coupling-piece hereinbefore mentioned is a loop or eye. (Marked L.) In said loop is a spring, $m$. On the upper side of bars $k\ k$ is a notch or depression. When the finger-bar is at right angles with the frame of the machine, the notch or depression is designed to connect with the upper part of loop L, and is held in that position by spring $m$. By this arrangement the finger-bar is supported and drawn forward. By means of hand-lever H and its connections the finger-bar may be elevated from the ground and held in any desired position above the ground by the seated driver. It matters not from which side of the machine said finger-bar projects.

The seat S, Fig. 2, is represented turned upward by full lines, so as to allow the tongue T to be turned over into position. (Shown in dotted lines.) By this arrangement, in combination with a finger-bar provided with a double-cutting apparatus, as represented in Fig. 1, my improved harvester may be used with its finger-bar on either side of the main frame or in advance of the supporting-wheels, as circumstances may require.

Great advantages are derived by the use of my improved harvester in working on hillsides and harvesting lodged grain and grass. I am also enabled to continue the harvest from one side of the field, thereby avoiding the trampling of the cut grass and securing it in better condition than it could be done if obliged to cut around lands, from the fact that the central portion of the land (or the last cut) must necessarily be harvested before properly cured.

Having described my improvement, what I claim therein, and desire to secure by Letters Patent, is—

1. Combining with the frame of a harvester a finger-bar which may be turned horizontally upon its pivoted connection from one side of the frame to the opposite side, substantially as described.

2. Combining with said finger-bar an elevating and supporting apparatus so arranged as to perform the same service whether the finger-bar projects to the right or left of the main frame, substantially as represented and described.

3. In combination with a finger-bar having its connection with the frame of the machine, substantially as described, a hinged driver's seat and a reversible tongue, co-operating together, whereby the machine may at pleasure be drawn in either direction, substantially as described.

HARVEY L. HOPKINS.

Witnesses:
A. W. MORSE,
GARDNER MORSE.